United States Patent
Shingu et al.

(10) Patent No.: US 8,384,788 B2
(45) Date of Patent: Feb. 26, 2013

(54) IMAGE PROCESSING APPARATUS, IMAGE PROCESSING SYSTEM, COMPUTER READABLE MEDIUM, AND IMAGE PROCESSING METHOD

(75) Inventors: Jun Shingu, Kanagawa (JP); Shingo Uchihashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/238,516

(22) Filed: Sep. 21, 2011

(65) Prior Publication Data

US 2012/0008000 A1    Jan. 12, 2012

Related U.S. Application Data

(62) Division of application No. 11/967,944, filed on Dec. 31, 2007, now Pat. No. 8,059,188.

(30) Foreign Application Priority Data

May 30, 2007 (JP) ................................. 2007-143588

(51) Int. Cl.
*H04N 5/232* (2006.01)
*H04N 5/222* (2006.01)
(52) U.S. Cl. .................................. 348/211.11; 348/370
(58) Field of Classification Search ............. 348/211.11
See application file for complete search history.

(56) References Cited

U.S. PATENT DOCUMENTS

| 6,598,797 | B2 | 7/2003 | Lee |
| 6,674,917 | B1 | 1/2004 | Hisaki et al. |
| 6,727,942 | B1 | 4/2004 | Miyano |
| 7,002,623 | B1 | 2/2006 | Ohyama et al. |
| 2004/0145674 | A1 | 7/2004 | Hoppe et al. |
| 2005/0219367 | A1 | 10/2005 | Kanda et al. |

FOREIGN PATENT DOCUMENTS

| JP | 7-306162 A | 11/1995 |
| JP | 2000-090233 A | 3/2000 |
| JP | 2000-92509 A | 3/2000 |
| JP | 2005-94746 A | 4/2005 |

OTHER PUBLICATIONS

Japanese Office Action corresponding to Japanese Patent Application No. 2007-142588 dated Aug. 23, 2011.

*Primary Examiner* — Albert Cutler
(74) *Attorney, Agent, or Firm* — Sughrue Mion, PLLC

(57) ABSTRACT

An image processing apparatus includes a memory that memorizes a plurality of pickup images in which an object has been picked up by varying an irradiation direction of a light; an extracting portion that extracts an area image of an area indicated by a user from each of the pickup images memorized in the memory; a calculating portion that calculates at least one illumination parameter for each area image by one of calculating an amount of edges from each extracted area image, executing a clustering process to brightness of each extracted area image, and executing a totaling process of totaling differences in brightness between the extracted area images; and a generating portion that generates at least one synthetic image by synthesizing the extracted area images with the at least one illumination parameter.

1 Claim, 11 Drawing Sheets

AMOUNT = 500 OF EDGES

AMOUNT = 200 OF EDGES

AMOUNT = 1000 OF EDGES

IMAGE PROCESSING APPARATUS, IMAGE PROCESSING SYSTEM, COMPUTER READABLE MEDIUM, AND IMAGE PROCESSING METHOD

CROSS-REFERENCE TO RELATED APPLICATION

This application is a divisional application of U.S. application Ser. No. 11/967,944 filed Dec. 31, 2007, which is based on and claims priority under 35 USC 119 from Japanese Patent Application No. 2007-143588 filed May 30, 2007.

BACKGROUND

1. Technical Field

This invention relates to an image processing apparatus, an image processing system, a computer readable medium, and an image processing method.

2. Related Art

There has been conventionally known an image processing apparatus which can send the texture, the gloss level or the like of an object to an observer. Moreover, there has been conventionally known a flaw detecting device provided with illuminating devices, and at least one photographing device.

SUMMARY

According to an aspect of the present invention, there is provided an image processing apparatus that includes a memory that memorizes a plurality of pickup images in which an object has been picked up by varying an irradiation direction of a light; an extracting portion that extracts an area image of an area indicated by a user from each of the pickup images memorized in the memory; a calculating portion that calculates at least one illumination parameter for each area image by one of calculating an amount of edges from each area image extracted by the extracting portion, executing a clustering process to brightness of each area image extracted by the extracting portion, and executing a totaling process of totaling differences in brightness between the area images extracted by the extracting portion; and a generating portion that generates at least one synthetic image by synthesizing the area images extracted by the extracting portion with the at least one illumination parameter.

BRIEF DESCRIPTION OF THE DRAWINGS

Exemplary embodiments of the present invention will be described in detail based on the following figures, wherein.

DETAILED DESCRIPTION

A description will now be given, with reference to the accompanying drawings, of exemplary embodiments of the present invention.

First Exemplary Embodiment

Figure 1:
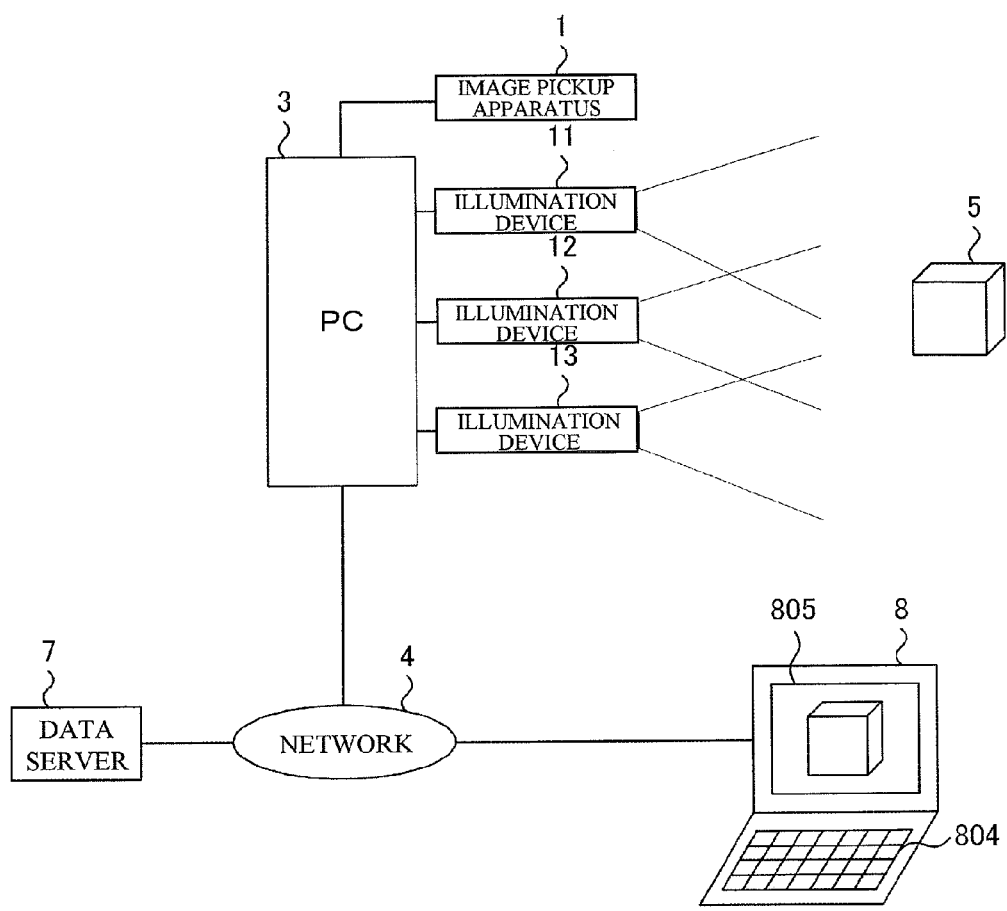
FIG. 1 is a block diagram showing the structure of an image processing system including an image processing apparatus in accordance with a first exemplary embodiment of the present invention.

FIG. 1 is a block diagram showing the structure of an image processing system including an image processing apparatus in accordance with a first exemplary embodiment of the present invention.

The image processing system is provided with a personal computer (PC) 3 functioning as a server, a data server 7, and a personal computer (PC) 8 functioning as a client. These elements are connected to each other via a network 4. Illumination devices 11 to 13 which are composed of lights, LEDs (Light Emitting Diodes) and so on, and an image pickup apparatus 1 which is composed of a video camera are connected to the PC 3. The illumination devices 11 to 13 emit lights to irradiate an object 5 based on respective control commands from the PC 3. The illumination devices connected to the PC 3 are not limited to three, but may be more than two.

The image pickup apparatus 1 picks up a reflected image from the object 5 and outputs a pickup image to the PC 3. Thus, the image pickup apparatus 1 picks up the whole image of the object 5.

The PC 3 outputs the pickup image picked up by the image pickup apparatus 1 to the data server 7 via the network 4. The PC 8 includes an operation unit 804 and a display unit 805. The display unit 805 displays the pickup image of the object 5 picked up by the image pickup apparatus 1. The PC 3 designates any area on the pickup image of the object 5, and outputs an instruction to generate a partial image of the brightness suitable for the area to the data server 7. Moreover, the PC 3 outputs control commands to the illumination devices 11 to 13 and the image pickup apparatus 1, so that the PC 3 may control the operations of the illumination devices 11 to 13 and the image pickup apparatus 1, e.g. irradiation angles and the brightness of the lights from the illumination devices 11 to 13, an pickup angle of the image pickup apparatus 1, the brightness of the pickup image and so on.

It should be noted that the client is the single PC 8 in FIG. 1, but the image processing system may include plural clients (PCs).

The PC 3, the data server 7, and the PC 8 are separately constituted, but the PC 3 and the data server 7, the data server 7 and the PC 8, or the PC 3, the data server 7 and the PC 8 may be constituted with a single information processing apparatus, e.g., a PC, a portable terminal, and so on. In this case, the single information processing apparatus includes a controlling unit, a transmitting and receiving unit, a memory unit, a display unit, an interface (IF) unit, not shown, and so on. The single information processing apparatus executes the same processes as processes executed by the PC 3 and the data server 7, the data server 7 and the PC 8, or the PC 3, the data server 7 and the PC 8.

Figure 2:
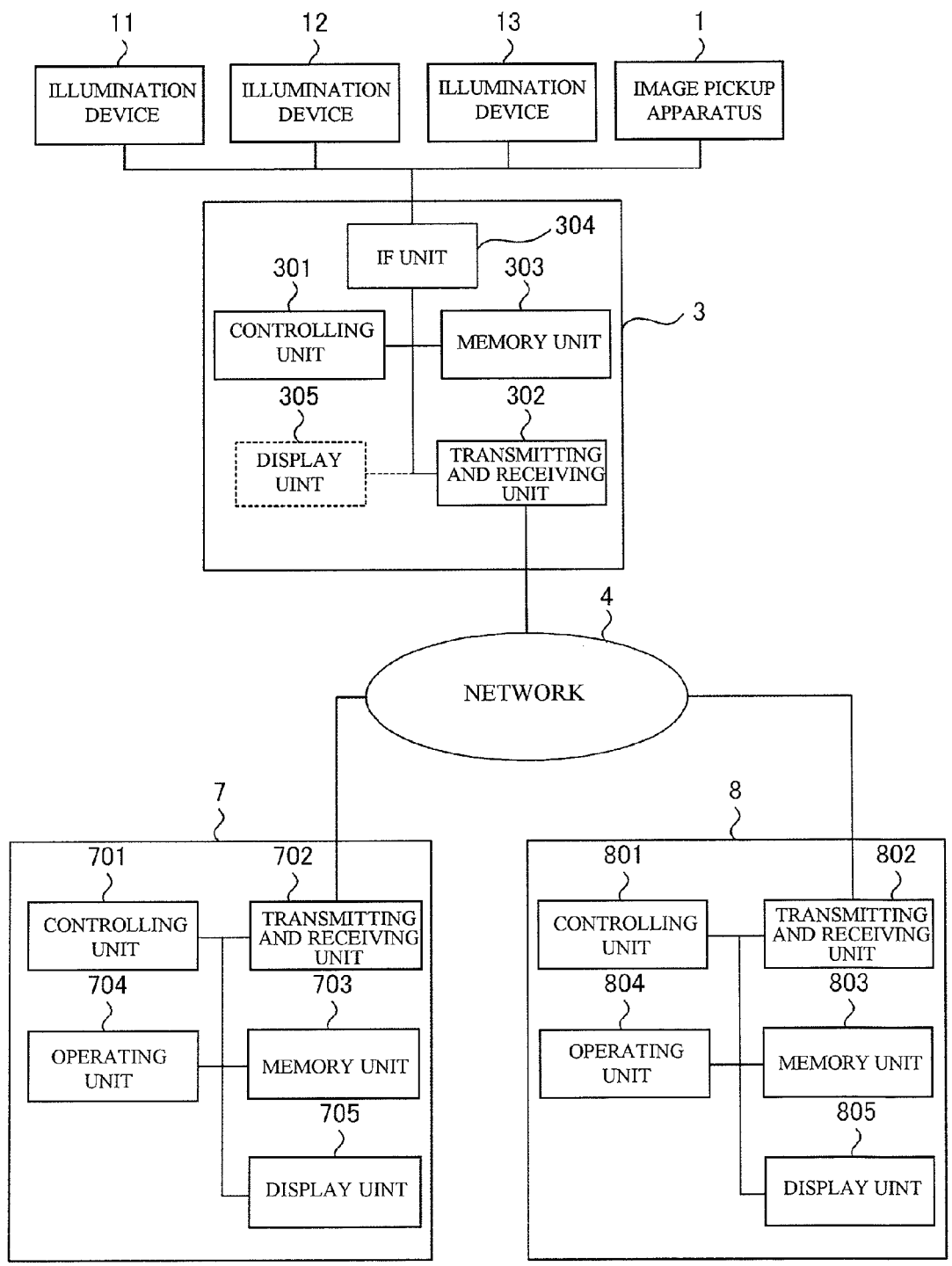
FIG. 2 is a block diagram showing the functional structure of a PC 3, a data server 7, and a PC 8.

FIG. 2 is a block diagram showing the functional structure of the PC 3, the data server 7, and the PC 8.

The PC 3 includes a controlling unit 301 that controls the entire apparatus and the operations of the illumination devices 11 to 13 and the image pickup apparatus 1, a transmitting and receiving unit 302 that transmits and receives information and data to/from the data server 7 or the PC 8 via the network 4, a memory unit 303 that memorizes a control program, data, information, and so on, an interface (IF) unit 304 that connects to the illumination devices 11 to 13 and the image pickup apparatus 1. Moreover, the PC 3 may include a display unit 305 that displays the pickup image picked up by the image pickup apparatus 1. The controlling unit 301 is connected to the transmitting and receiving unit 302, the memory unit 303, the IF unit 304, and the display unit 305, and further to the illumination devices 11 to 13 and the image pickup apparatus 1 via the IF unit 304.

The data server 7 includes a controlling unit 701 (an extracting portion, a calculating portion, and a generating portion) that controls the entire apparatus, a transmitting and receiving unit 702 that transmits and receives information and data to/from the PC 3 or the PC 8 via the network 4, a memory unit 703 (a memory) that memorizes a control program, the pickup images, data, information, and so on, an operating unit 704 (a varying portion, an input portion, and an instructing portion) that is composed of a mouse, a keyboard, and so on, a display unit 705 (a display). The controlling unit 701 is connected to the transmitting and receiving unit 702, the memory unit 703, the operating unit 704, and the display unit 705.

The PC 8 includes a controlling unit 801 that controls the entire apparatus, a transmitting and receiving unit 802 that transmits and receives information and data to/from the PC 3 or the data server 7 via the network 4, a memory unit 803 that memorizes a control program, data, information, and so on, an operating unit 804 (a varying portion) that is composed of a mouse, a keyboard, and so on, and a display unit 805 (a display). The controlling unit 801 is connected to the transmitting and receiving unit 802, the memory unit 803, the operating unit 804, and the display unit 805.

Figure 3:
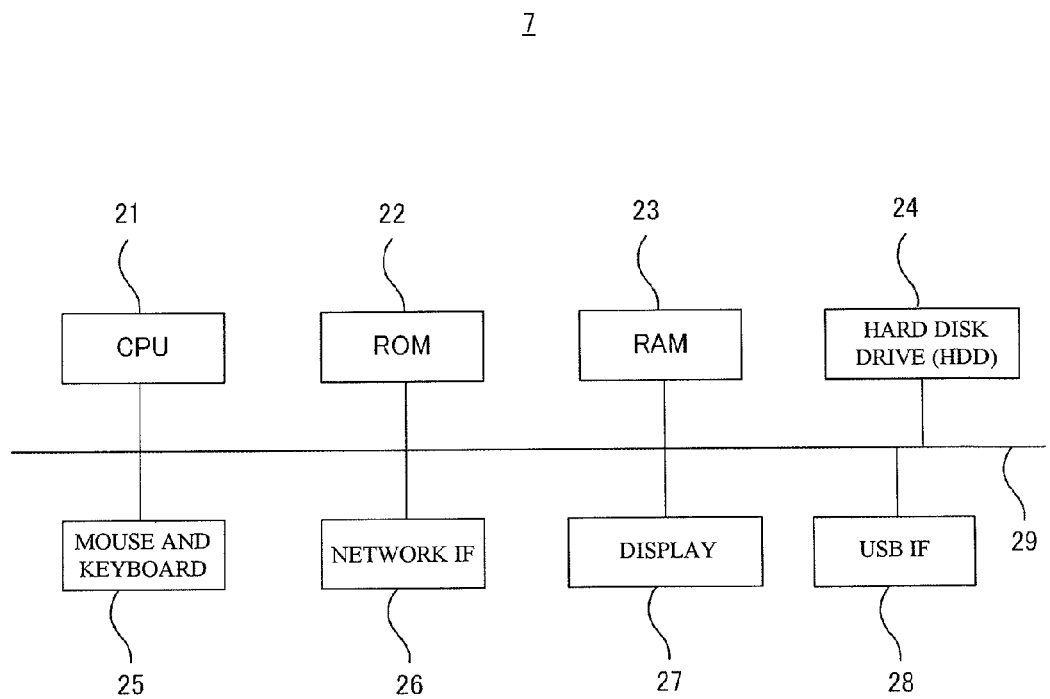
FIG. 3 is a block diagram showing the hardware structure of the data server 7.

FIG. 3 is a block diagram showing the hardware structure of the data server 7.

The data server 7 is provided with a CPU 21 that controls the entire apparatus, a ROM 22 including the control program, a RAM 23 functioning as a working area, a hard disk drive (HDD) 24 including a variety of information and programs, a mouse and a keyboard 25 (hereinafter referred to as simply "mouse and keyboard"), a network interface (IF) 26 for connecting to another computer, a display 27 that is composed of a liquid crystal monitor or a CRT (cathode-ray tube), and a USB (universal serial bus) interface (IF) 28 for connecting to a USB device, not shown. The CPU 21 is connected to the ROM 22, the RAM 23, the HDD 24, the mouse and keyboard 25, the network IF 26, the display 27, and the USB IF 28 via a system bus 29.

The controlling unit 701 corresponds to the CPU 21 executing a variety of processes according to the control program included in the ROM 22. The transmitting and receiving unit 702 corresponds to the network IF 26, and the memory unit 703 corresponds to the HDD 24. The operating unit 704 corresponds to the mouse and keyboard 25. The display unit 705 corresponds to the display 27. The PC 3 and the PC 8 also have the same hardware structure as the above-mentioned hardware structure.

Figure 4:
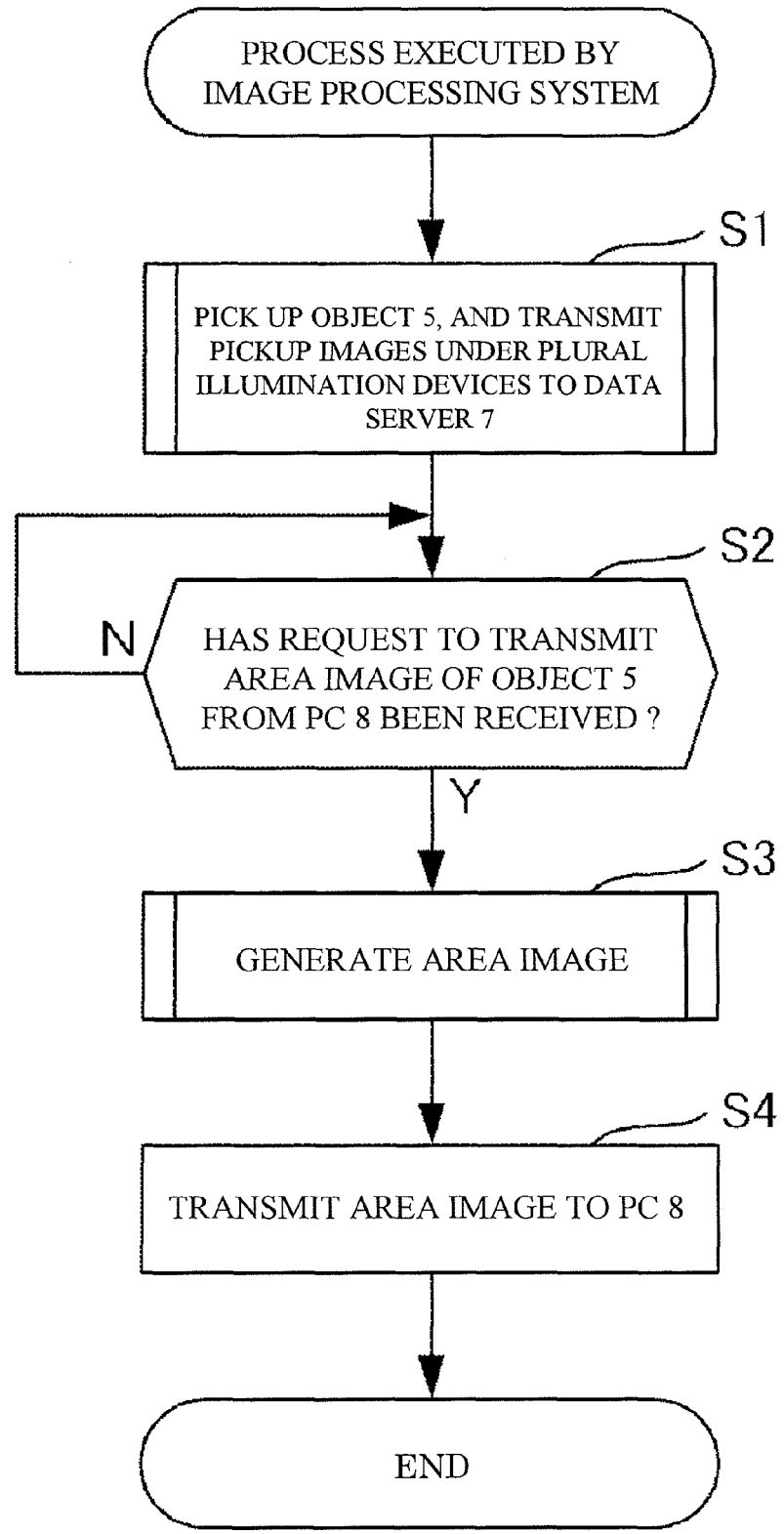
FIG. 4 is a flowchart showing a process executed by the image processing system in FIG. 1.

FIG. 4 is a flowchart showing a process executed by the image processing system in FIG. 1.

First, the PC 3 controls the illumination devices 11 to 13, picks up the object 5 with the image pickup apparatus 1, and transmits plural pickup images under plural illuminations to the data server 7 (step S1). At this time, the data server 7 accumulates the plural pickup images from the PC 3 into the memory unit 703.

Next, the data server 7 determines whether a request to transmit an area image of the object 5 from the PC 8 has been received (step S2). The area image is an image included in an area designated by the PC8. That is, when the area designated by the PC8 is the whole of a pickup image, the area image is the same as the pickup image, and when the area designated by the PC8 is a part of the pickup image, the area image is a partial image of the pickup image.

If the request to transmit the area image of the object 5 from the PC 8 has not been received ("NO" in step S2), the step S2 is repeatedly executed. On the other hand, if the request to transmit the area image of the object 5 from the PC 8 has been received ("YES" in step S2), the data server 7 generates the area image based on the pickup image accumulated into the memory unit 703 (step S3), and transmits the generated area image to the PC 8 (step S4). Then, the present process is terminated.

Figure 5:
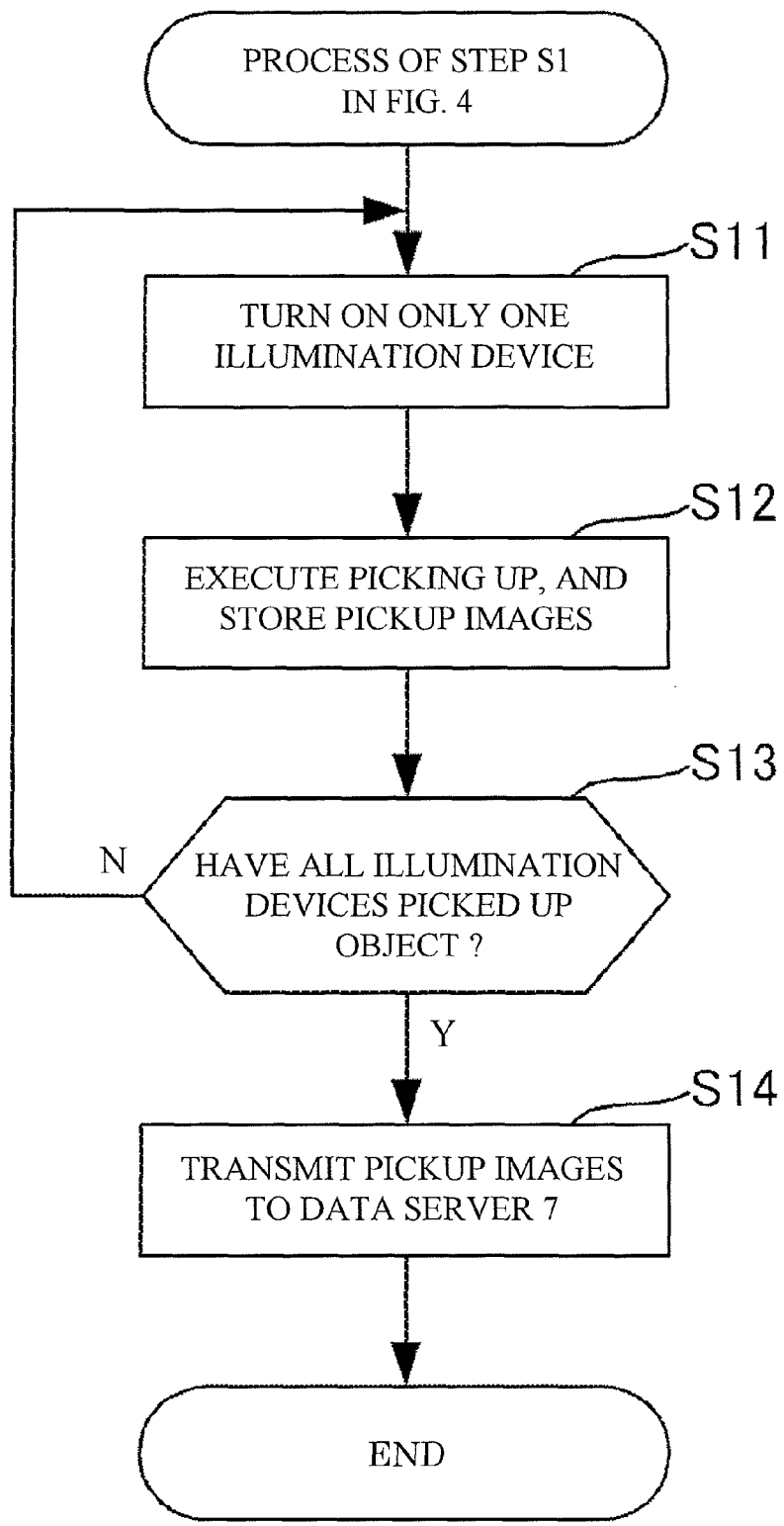
FIG. 5 is a flowchart showing a detailed process of step S1 in FIG. 4.

FIG. 5 is a flowchart showing a detailed process of step S1 in FIG. 4.

First, the PC 3 turns on only one of the illumination devices 11 to 13 (step S11), causes the image pickup apparatus 1 to pick up the object 5, and stores the pickup images of the object 5 into the memory unit 303 (step S12). Here, when the only illumination device 11 is turned on, an image picked up by the image pickup apparatus 1 is defined as a pickup image 31, when the only illumination device 12 is turned on, an image picked up by the image pickup apparatus 1 is defined as a pickup image 32, when the only illumination device 13 is turned on, an image picked up by the image pickup apparatus 1 is defined as a pickup image 33. Similarly, when other illumination devices, not shown, are turned on one-by-one, images picked up by the image pickup apparatus 1 are defined as pickup images 34, 35, . . . , respectively.

Next, the PC 3 determines whether all illumination devices have picked up the object 5 (step S13). If the answer to the determination of step S13 is NO, the process returns to step S11. On the other hand, if the answer to the determination of step S13 is YES, the PC 3 transmits the pickup images stored into the memory unit 303 to the data server 7 (step S14). Then, the present process is terminated.

The data server 7 receives the pickup images from the PC 3, stores the pickup images into the memory unit 703, and executes preprocessing such as predetermined calculation or noise rejection in preparation for image generation.

Figure 6:
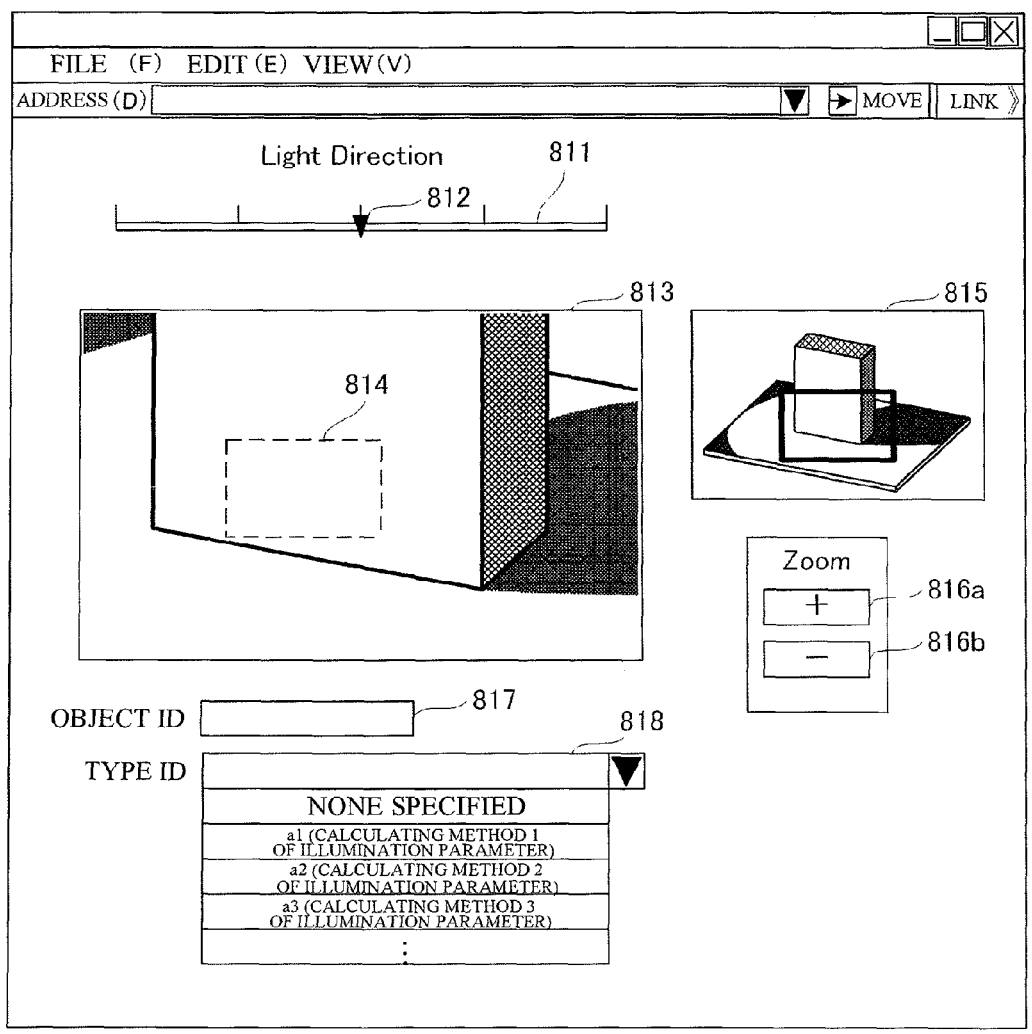
FIG. 6 is a diagram showing an example of a user interface (user IF) displayed in a display unit 805 of the PC 8.

FIG. 6 is a diagram showing an example of a user interface (user IF) displayed in a display unit 805 of the PC 8. It should be noted that, when the data server 7 and the PC 8 are constituted with a single PC, the user IF is displayed in a display unit of the single PC.

As shown in FIG. 6, the user IF is displayed with a browser. A pointer 812 on a slide bar 811 is moved to the right or the left, so that an image displayed on an image display area 813 is varied. The operating unit 804, the slide bar 811, and the pointer 812 constitute a varying portion.

An ID of the object 5 displayed on a whole image display area 815 is input to a field of an object ID 817 (an input portion), and a calculation method of a illumination parameter, described later, is input to a field of a type ID 818 (an instructing portion). It should be noted that the field of the type ID 818 may not be included on the user IF. In this case, the controlling unit 701 calculates the illumination parameter with a preset calculation method.

When an image area 814 displayed on the image display area 813 is designated by the mouse and so on, the controlling unit 801 of the PC 8 transmits an object ID, a type ID, coordinates of the designated area as a request to transmit an area image of the object 5, to the data server 7. The data server 7 selects plural pickup images of the desired object based on the object ID, decides a calculation method of a illumination parameter, described later, based on the type ID, extracts images corresponding to the designated area from the plural pickup images based on the coordinates of the designated area, and executes image processing, i.e., synthesizing processing, described later. The data server 7 transmits a single or plural area image(s) after the image processing to the PC 8 (hereinafter, the single or plural image(s) finally generated by synthesizing the area images with each other is referred to as "synthetic image(s)"). The PC 8 receives the single or plural synthetic image (s) after the image processing, and displays one of the single or plural synthetic image(s) on the image display area 813. When the PC 8 receives the plural synthetic images, a synthetic image displayed on the image display area 813 is varied by moving the pointer 812 on the slide bar 811 to the right or the left, performing mouseover on the synthetic image, or the like. When the synthetic image displayed on the image display area 813 is varied, the PC 8 may add a process such as cross-fading (i.e., an effect that an image is gradually varied) to the varying process.

When the image area 814 displayed now on the image display area 813 is designated by the mouse and so on, the area image on the image area 814 is displayed at an enlarged size on the image display area 813 by a digital zoom process. On the whole image display area 815, the whole of a pickup image is displayed, and a partial image displayed now at an enlarged size on the image display area 813 is displayed at a framed rectangle within the whole image display area 815.

When a zoom-in button (+) 816*a* or a zoom-out button (−) 816*b* is pressed, the data server 7 performs a digital zoom process on the image displayed on the whole image display area 815, and provides the zoomed in or zoomed out image which is displayed on the whole image display area 815.

It should be noted that a size of the image area 814 designated by the mouse and so on is not limit to a size of part of the image displayed on the image display area 813, but may be the same as a size of the whole of the image displayed on the image display area 813.

Figure 7:
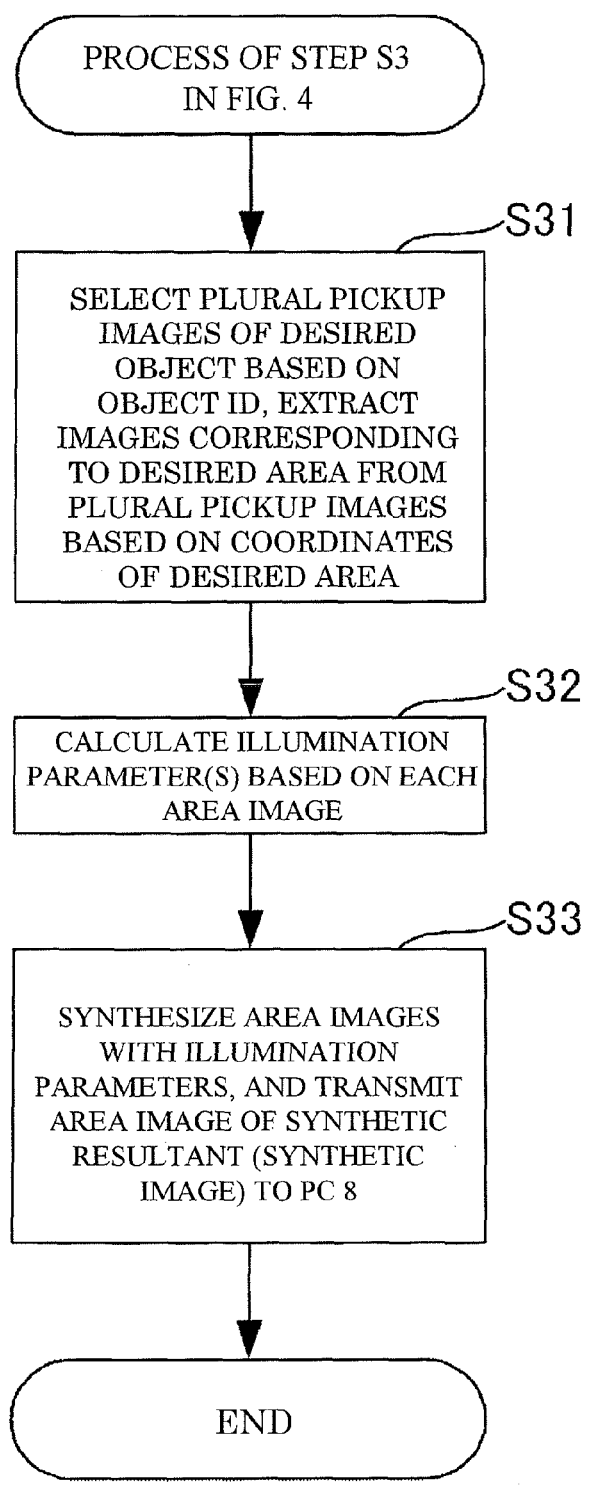
FIG. 7 is a flowchart showing a detailed process of step S3 in FIG. 4.
Figure 8A:
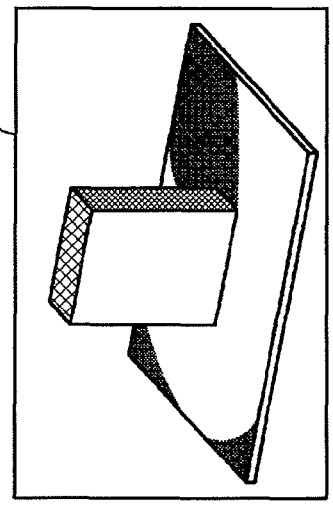
FIGS. 8A to 8C are diagrams showing examples of pickup images 31 to 33, respectively.
Figure 8B:
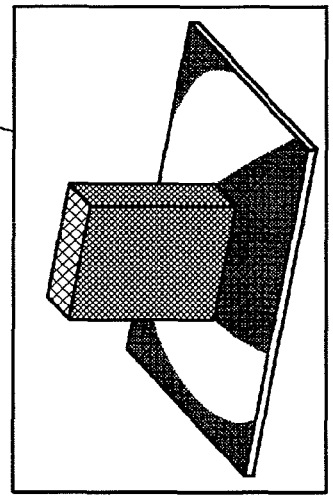
Figure 8C:
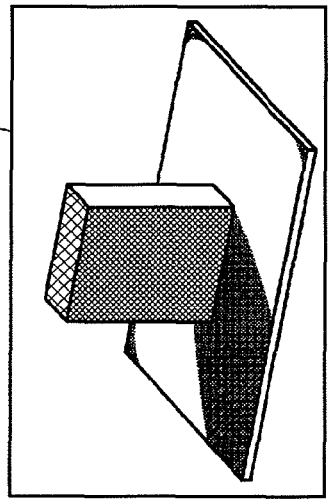
Figure 8D:
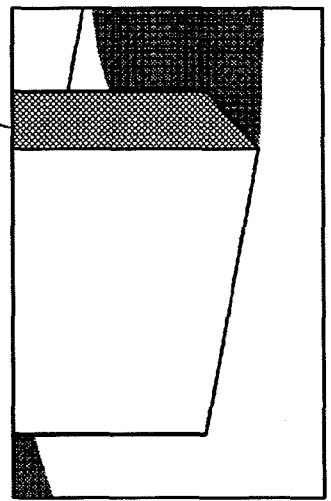
FIGS. 8D to 8F are diagrams showing examples of area images 41 to 43, respectively.
Figure 8E:
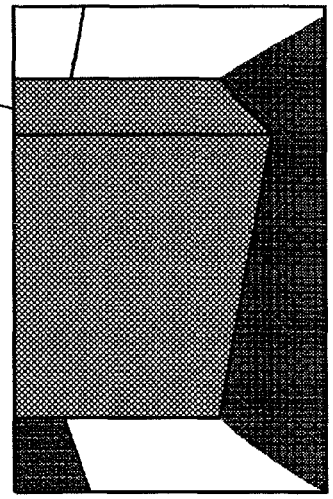
Figure 8F:
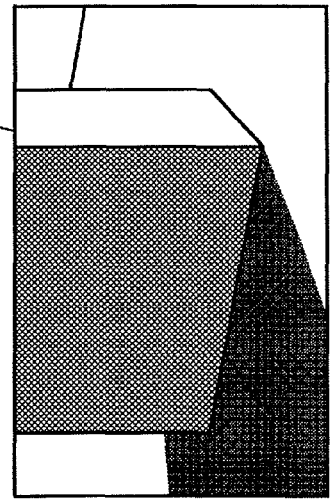

FIG. 7 is a flowchart showing a detailed process of step S3 in FIG. 4.

First, the controlling unit 701 of the data server 7 selects plural pickup images of the desired object based on the object ID received from the PC8, and extracts images corresponding to a designated area from the plural pickup images based on the coordinates of the designated area received from the PC8 (step S31). For example, as shown in FIG. 8, if the pickup images of the desired object are the pickup images 31 to 33, images extracted from the pickup images based on the coordinates of the designated area are area images 41 to 43, respectively.

Next, the controlling unit 701 calculates the single or plural illumination parameter(s) based on each of the area images (step S32).

The illumination parameter is calculated by one of the following three methods:

(1) A method of calculating the illumination parameter by calculating an amount of edges from each area image;

(2) A method of calculating the illumination parameter by executing a clustering process to brightness of each area image; and (3) A method of calculating the illumination parameter by executing the totaling process of totaling differences in brightness between the area images. It is decided by the type ID by which method the illumination parameter is calculated.

First, a description will now be given of (1) a method of calculating the illumination parameter by calculating an amount of edges from each area image. In this method, the controlling unit 701 executes an edge extraction of each area image, and sets the amount of edges included in each area image to the corresponding illumination parameter. There are many methods such as a primary differential as the method of the edge extraction. For example, the amounts of edges included in the area images 41 to 43 in FIG. 8 are "500", "200", and "1000" in order, and these values or values obtained by a simple calculation are set to the respective illumination parameter. The simple calculation may be envisaged in which the amount of edges is divided by a predetermined value, or the amount of edges is multiplied by a rate such that a maximum value of the amount of edges becomes a predetermined value, for example. The illumination parameter is calculated with the method (1), so that the synthetic image with more edges is finally generated.

Next, a description will now be given of (2) a method of calculating the illumination parameter by executing a clustering process to brightness of each area image.

First, when the coordinates of each pixel included in each area image i are defined as pixel position (x, y), and the brightness of the pixel position (x, y) is defined as brightness $Z_i(x, y)$, the controlling unit 701 executes a clustering process to brightness of all pixels included in each area image, i.e., all brightness $Z_i(x, y)$, and divides the brightness of all pixels into plural cluster groups. Then, the controlling unit 701 sets an average of the brightness of each cluster group to the illumination parameter. In the clustering process, a well-known method such as a k-means method is used.

In the method (2), for the area images 41 to 43, the respective plural illumination parameters are obtained, and hence plural synthetic images to which the brightness is adjusted are finally generated. For example, when for the area images 41 to 43, four illumination parameters are obtained respectively, i.e., the brightness of each area image is divided into four cluster groups, four synthetic images are finally generated. Here, when the brightness $Z_i(x, y)$ of all pixels is divided into the plural cluster groups, an average of the brightness of cluster group with the most number of pixels is set to the illumination parameter, so that for the area images 41 to 43, the single illumination parameter may be obtained respectively.

Next, a description will now be given of (3) a method of calculating the illumination parameter by executing the totaling process of totaling differences in brightness between the area images.

Here, the coordinates of each pixel included in each area image i as a processing object are defined as pixel position (x, y), the brightness of the pixel position (x, y) is defined as brightness $Z_i(x, y)$, and the brightness of each pixel included in each area image i' as a comparative object is defined as brightness $Z_i'(x, y)$. When the controlling unit 701 calculates the illumination parameter on condition that differences in brightness between each area image i and each area image i' are in a small state, the controlling unit 701 subtracts each of absolute values of differences in brightness between all pixels included in each area image i and all pixels included in each area image i' from a maximum value of brightness of a pixel, and sets the total of the subtracted values to the illumination parameter. That is, the controlling unit 701 calculates the illumination parameter according to the following equation (1). The maximum value of brightness of a pixel is generally 255 (graduation), and in the following equation (1), the maximum value is described as "255".

$$\text{Illumination Parameter} = \sum_{i'} \sum_{x} \sum_{y} (255 - |Z_i(x, y) - Z_{i'}(x, y)|) \quad (1)$$

When the controlling unit 701 calculates the illumination parameter on condition that differences in brightness between each area image i and each area image i' are in a large state, the controlling unit 701 calculates absolute values of differences in brightness between all pixels included in each area image i and all pixels included in each area image i', and sets the total of the calculated values to the illumination parameter. That is, the controlling unit 701 calculates the illumination parameter according to the following equation (2).

$$\text{Illumination Parameter} = \sum_{i'} \sum_{x} \sum_{y} (|Z_i(x, y) - Z_{i'}(x, y)|) \quad (2)$$

It should be noted that when the controlling unit 701 calculates the illumination parameter on condition that differences in brightness between each area image i and each area image i' are in a large state, the controlling unit 701 pre-calculates an average Zmean(x, y) of brightness of all pixels included in each area image i to eliminate the influence of a shadow. Then, the controlling unit 701 may eliminate pixels with a relation of "Zi(x, y)<Zmean(x, y)" from the addition in the above-mentioned equation (2).

According to the above-mentioned equations (1) and (2), the illumination parameter of the area image 41 is a total value of a difference in brightness between the area image 41 and the area image 42, and a difference in brightness between the area image 41 and the area image 43, for example.

In FIG. 7, the controlling unit 701 synthesizes the area images with the illumination parameters calculated in step S32, and transmits an area image of the synthetic resultant, i.e., a synthetic image to the PC 8 (step S33). Then, the present process is terminated.

In step S33, specifically, the controlling unit 701 weights the area images with the illumination parameters of corresponding area images respectively, overlaps the weighting resultants with each other, and corrects brightness or color, e.g. white balance of the overlapped area image with a function f to generate the synthetic image. That is, the controlling unit 701 generates the synthetic image according to the following equation (3).

Synthetic Image=f(area image 41*the illumination parameters therefor+area image 42*the illumination parameters therefor+area image 43*the illumination parameters therefor+ . . . ) (3)

Here, the function f is a linear transformation function transforming a brightness scale of an image, a function transforming a histogram such as a histogram smoothing, i.e., transforming appearance distribution of the density values of an image, or the like.

According to the above-mentioned equation (3), the single or plural synthetic image(s) in which the brightness of the area images are adjusted still more may be generated.

When the illumination parameter is calculated with the above-mentioned method (1) or (3), the single illumination parameter is calculated for each image area, this is not limitative, but the controlling unit 701, for example, may divide each image area into two in top and bottom or right and left, or into four in top, bottom, right and left, and calculate the single illumination parameter for each divided image area. As a result, two or four illumination parameters are calculated from the single image area, and hence two or four synthetic images are generated.

For example, when each image area is divided into two in right and left, and a single illumination parameter is calculated for each divided image area, the controlling unit 701 calculates illumination parameters for the area images 41 to 43 with areas of the right half of the area images 41 to 43, and another illumination parameters for the area images 41 to 43 with areas of the left half of the area images 41 to 43. The controlling unit 701 synthesizes the area images 41 to 43 with the illumination parameters therefor calculated with the areas of the right half of the area images 41 to 43, so that a synthetic image in which edges included in the areas of the right half of the area images 41 to 43 are emphasized is generated. Similarly, the controlling unit 701 synthesizes the area images 41 to 43 with another illumination parameters therefor calculated with the areas of the left half of the area images 41 to 43, so that a synthetic image in which edges included in the areas of the left half of the area images 41 to 43 are emphasized is generated.

When the area images are synthesized with the corresponding illumination parameters calculated in accordance with the above-mentioned equation (1), the corresponding illumination parameters are calculated by the method suitable for a state in which differences in brightness between the area images are small, and hence the synthetic image with a few shadows may be generated. When the area images are synthesized with the corresponding illumination parameters calculated in accordance with the above-mentioned equation (2), the corresponding illumination parameters are calculated by the method suitable for a state in which differences in brightness between the area images are large, and hence the synthetic image with much contrast may be generated. Moreover, when the area images are synthesized with the corresponding illumination parameters in which the influence of the shadow is eliminated, and which are calculated in accordance with the above-mentioned equation (2), the corresponding illumination parameters are calculated by the method suitable for a state in which the shadow is eliminated and differences in brightness between the area images are large, and hence the synthetic image with much gloss may be generated.

When the illumination parameter is calculated with the above-mentioned method (3), the single illumination parameter is calculated for each image area, this is not limitative, but the controlling unit 701, for example, may divide each image area into plural pixel groups by the clustering process, and calculate the single illumination parameter for each divided pixel group. As a result, the plural illumination parameters are calculated from the single image area, and hence plural synthetic images are generated. For example, if each image area is divided into three pixel groups by the clustering process, three illumination parameters are calculated, so that three synthetic images are generated.

For example, when the controlling unit 701 calculates the illumination parameter on condition that differences in brightness between the area images are in a large state, influence degree in which the illumination gives a certain pixel is represented by the following equation (4).

$$\text{Influence Degree of Illumination } i \text{ to Pixel } (x, y) = \quad (4)$$

$$\sum_{i'} (|Z_i(x, y) - Z_{i'}(x, y)|)$$

The controlling unit 701 executes the clustering process to values of the influence degree, and divides all pixels included in each area image into plural pixel groups, e.g. pixel groups A and B. The controlling unit 701 calculates the illumination parameter for each divided pixel group according to the above-mentioned equation (2). If the controlling unit 701 synthesizes the area images 41 to 43 with the illumination parameters calculated based on pixels included in the pixel group A, the synthetic image in which the gloss of a certain part thereof is emphasized is generated. If the controlling unit 701 synthesizes the area images 41 to 43 with the illumination parameters calculated based on pixels included in the pixel group B, the synthetic image in which the gloss of another part thereof is emphasized is generated.

As described in detail above, according to the present exemplary embodiment, the memory unit 703 of the data server 7 memorizes plural pickup images in which the object 5 has been picked up by varying an irradiation direction of a light. The controlling unit 701 extracts the area image of the area indicated by a user from each of the pickup images memorized in the memory unit 703, calculates the single or plural illumination parameter(s) for each area image by one of calculating an amount of edges from each extracted area image, executing the clustering process to brightness of each extracted area image, and executing the totaling process of totaling differences in brightness between the area images, and generates the single or plural synthetic image(s) by synthesizing the area images with the single or plural parameter(s).

Thus, since the single or plural synthetic image(s) in which the amount of edges or the brightness of the area images is adjusted is/are generated, it is possible to prevent a small flaw, a design or the like on the object from being buried in the pickup image of the object 5, or being unrecognizable by the user. As a result, at least one image which may let the user observe the surface on the object 5 effectively may be obtained from the plural pickup images in which the object 5 has been picked up by varying the irradiation direction of the light.

The area image extracted by the controlling unit 701 is the whole or a part of each of the pickup images memorized in the memory unit 703, and hence at least one image which may let the user observe the whole or a part of the surface on the object 5 effectively may be obtained from the plural pickup images in which the object 5 has been picked up by varying the irradiation direction of the light.

The image display area 813 displays the single or plural synthetic image(s) generated by the controlling unit 701, and the slide bar 811 and the pointer 812 vary the synthetic image (s) displayed on the image display area 813 depending on the irradiation direction of the light. Therefore, the plural synthetic images may be varied and displayed depending on the irradiation direction of the light, which may let the user observe the surface on the object 5 effectively.

The image display area 813 displays the single or plural synthetic image(s) generated by the controlling unit 701 at an enlarged size or a reduced size, and the surface on the object 5 therefore may be observed at an enlarged state or a reduced state by the user.

The identification information of the object, i.e., the object ID is input to the field of the object ID 817, and the calculation method of the illumination parameter is input to the field of the type ID 818 (i.e., one of calculating the amount of edges from each area image, executing the clustering process to brightness of each area image, and executing the totaling process of totaling differences in brightness between the area images is instructed). Therefore, by executing a process desired by the user, the single or plural synthetic image(s) may be obtained from the plural pickup images in which the object desired by the user has been picked up.

In the image processing system in FIG. 1, by varying the turn-on of the three illumination devices in order, the image pickup apparatus 1 picks up the object 5. However, in the image processing system, a process that the image pickup apparatus 1 picks up the object 5 at a first position, the user or the PC 3 then moves one illumination device, and the image pickup apparatus 1 picks up the object 5 at a movement position again may be repeated twice.

Second Exemplary Embodiment

Figure 9:
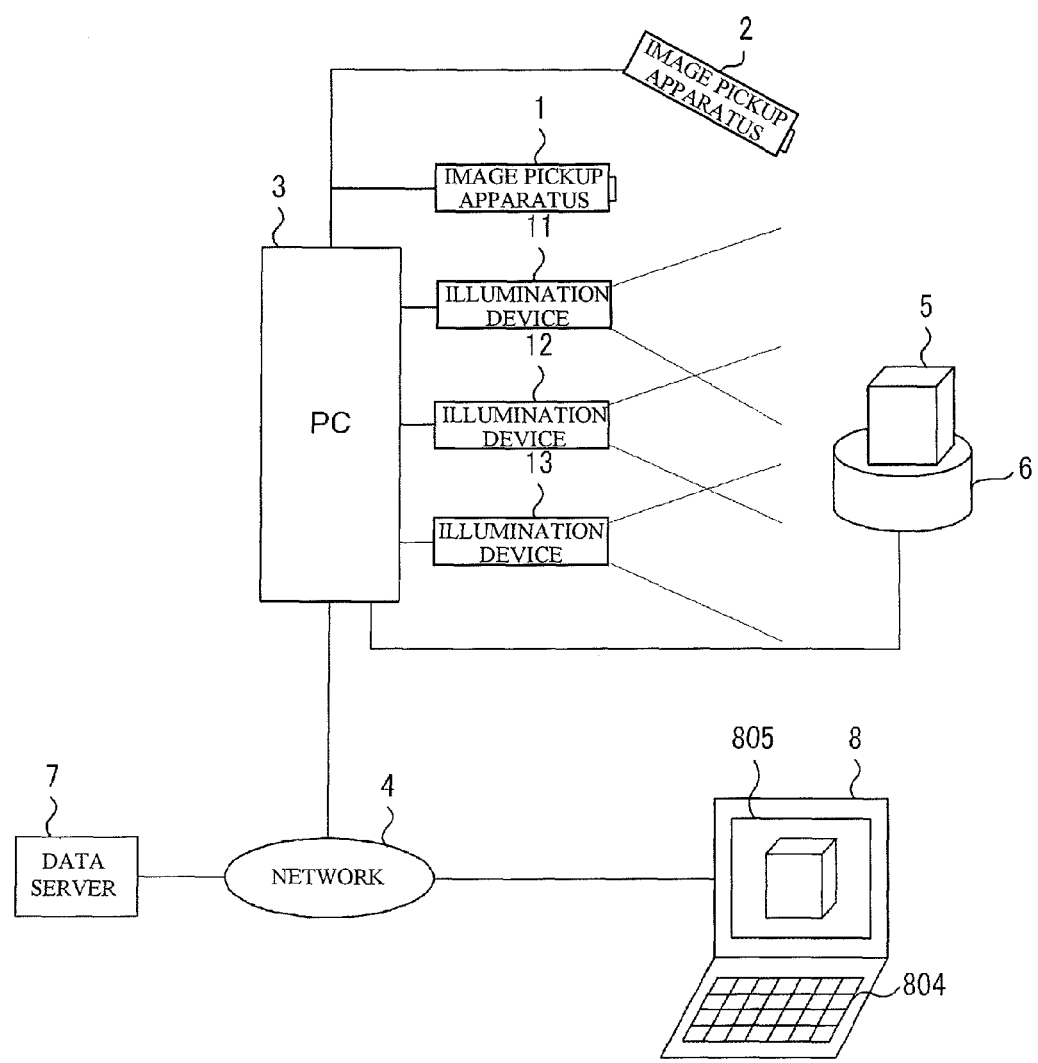
FIG. 9 is a block diagram showing the structure of an image processing system in accordance with a second exemplary embodiment of the present invention.

FIG. 9 is a block diagram showing the structure of an image processing system in accordance with a second exemplary embodiment of the present invention.

The image processing system in FIG. 9 is different from the image processing system in FIG. 1 in further including an image pickup apparatus 2 picking up the object 5, and a turning table 6 turning the object 5. The image pickup apparatus 2 and the turning table 6 are connected to the PC 3, and operate according to the control of the PC3. With the exception of the image pickup apparatus 2 and the turning table 6, the other elements are identical to the corresponding ones in the image processing system in FIG. 1, and therefore description thereof is omitted.

The image processing system in FIG. 9 executes the above-mentioned process in FIG. 4, but the procedure of step S1 is different from the above-mentioned process in FIG. 5, and therefore a description thereof will now be given.

Figure 10:
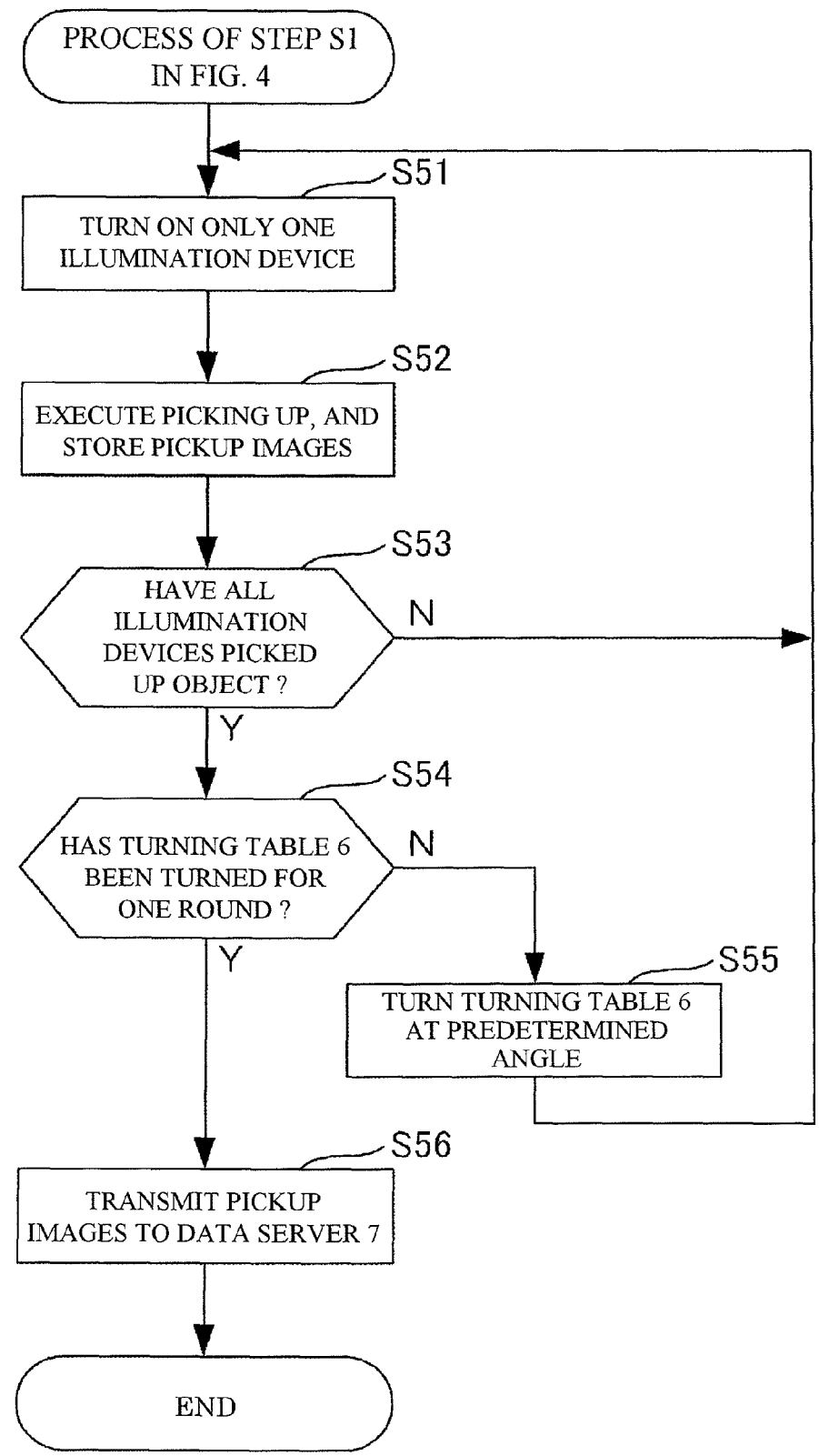
FIG. 10 is a flowchart showing a detailed process of step S1 in FIG. 4.

FIG. 10 is a flowchart showing a detailed process of step S1 in FIG. 4.

First, the PC 3 turns on only one of the illumination devices 11 to 13 (step S51), causes the image pickup apparatuses 1 and 2 to pick up the object 5, and stores the pickup images of the object 5 into the memory unit 303 (step S52).

Next, the PC 3 determines whether all illumination devices have picked up the object 5 (step S53). If the answer to the determination of step S53 is NO, the process returns to step S11. On the other hand, if the answer to the determination of step S13 is YES, the PC 3 determines whether the turning table 6 has been turned for one round (step S54). If the answer to the determination of step S54 is NO, the PC3 turns the turning table 6 at a predetermined angle, e.g. 30 degrees, 45 degrees, 60 degrees, 90 degrees, or the like (step S55), the process returns to step S51.

The PC 3 counts the number of times in which the turning table 6 has been turned in step S55, executes the determination of step S54 according to the number of times. For example, if the PC3 turns the turning table 6 at 30 degrees at a time, the PC 3 determines that the answer to the determination of step S54 is NO until the number of times in which the turning table 6 has been turned arrives at 12 times.

If the answer to the determination of step S54 is YES, the PC 3 transmits the pickup images stored into the memory unit 303 to the data server 7 (step S56). Then, the present process is terminated.

Figure 11:
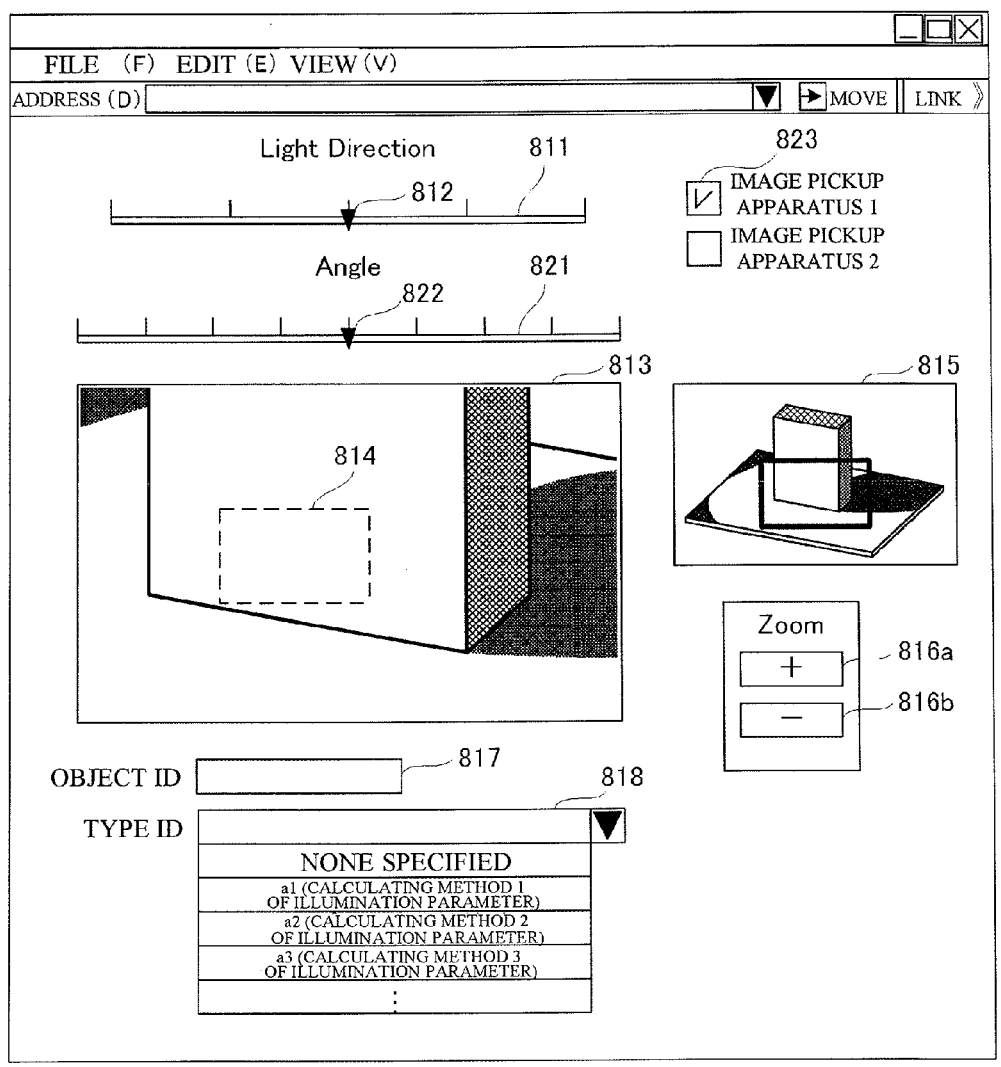
FIG. 11 is a diagram showing an example of a user interface (user IF) displayed in a display unit 805 of the PC 8.

FIG. 11 is a diagram showing an example of a user interface (user IF) displayed in a display unit 805 of the PC 8. The user IF is different from the user IF in FIG. 6 in further including a slide bar 821 and a pointer 822 for selecting a desired angle, and a check box 823 for selecting a desired image pickup apparatus. The other elements of the user IF in FIG. 11 are identical to the corresponding ones in the user IF in FIG. 6, and therefore description thereof is omitted.

It should be noted that after the desired angle and image pickup apparatus are selected on the user IF of the PC8, the above-mentioned procedures of steps S2 to S4 in FIG. 4 are executed.

According to the present exemplary embodiment, the user may select the desired angle and image pickup apparatus on the user IF of the PC8, and observe the synthetic image generated with the pickup images which have been picked up by the desired angle and image pickup apparatus. When the user varies the desired angle or image pickup apparatus on the user IF of the PC8, the user may observe the synthetic image generated with the pickup images which have been picked up at the varied angle or with the varied image pickup apparatus, as required.

The memory unit 703 memorizes the plural pickup images in which each of the image pickup apparatuses 1 and 2 has picked up the object 5 by varying the irradiation direction of the light, and each of the image pickup apparatuses 1 and 2 has picked up the object 5 from plural different angles. The image display area 813 displays the single or plural synthetic image(s) generated by the controlling unit 701. The single or plural synthetic image(s) displayed on the image display area 813 is varied depending on a selected type of the image pickup apparatuses 1 and 2, a selected pickup angle of the plural pickup images, or the irradiation direction of the light by the slide bars 811 and 821, the pointers 812 and 822, and the check box 823.

Thus, the plural synthetic images may be varied and displayed depending on the selected type of the image pickup apparatuses 1 and 2, the selected pickup angle of the plural pickup images, or the irradiation direction of the light, which may let the user observe the surface on the object 5 effectively.

The operating unit 804, the slide bars 811 and 821, the pointers 812 and 822, and the check box 823 constitute a varying portion.

A recording medium on which the software program for realizing the function of the data server 7 is recorded may be supplied to the data server 7, and the controlling unit 701 of the data server 7 may read and execute the program recorded on the recording medium. In this manner, the same effects as those of the above-mentioned first and second exemplary embodiments may be achieved. The recording medium for providing the program may be a CD-ROM, a DVD, or a SD card, for example.

Alternatively, the controlling unit 701 of the data server 7 may execute a software program for realizing the function of the data server 7, so as to achieve the same effects as those of the above-mentioned first and second exemplary embodiments.

It should be noted that the present invention is not limited to those exemplary embodiments, and various modifications may be made to them without departing from the scope of the invention.

What is claimed is:

1. An image processing system including a plurality of image pickup apparatuses, an image processing apparatus, and an information processing apparatus, the image processing apparatus including:

a memory that memorizes a plurality of pickup images in which each image pickup apparatus has picked up an object by varying an irradiation direction of a light, and each image pickup apparatus has picked up the object from a plurality of different angles;

an extracting portion that extracts an area image of an area indicated by a user from each of the pickup images memorized in the memory;

a calculating portion that calculates at least one illumination parameter for each area image by one of calculating an amount of edges from each area image extracted by the extracting portion, executing a clustering process to brightness of each area image extracted by the extracting portion, and executing a totaling process of totaling differences in brightness between the area images extracted by the extracting portion; and a generating portion that generates at least one synthetic image by synthesizing the area images extracted by the extracting portion with the at least one illumination parameter, the information processing apparatus including:

a display that displays the at least one synthetic image generated by the generating portion; and a varying portion that varies the at least one synthetic image displayed in the display depending on one of a selected type of the plurality of image pickup apparatuses, a selected pickup angle of the plurality of pickup images, and the irradiation direction of the light.

* * * * *